United States Patent
Yamagishi

(10) Patent No.: US 9,554,181 B2
(45) Date of Patent: *Jan. 24, 2017

(54) CONTENT SUPPLY DEVICE, CONTENT SUPPLY METHOD, PROGRAM, TERMINAL DEVICE AND CONTENT SUPPLY SYSTEM

(71) Applicant: Sony Corporation, Tokyo (JP)

(72) Inventor: Yasuaki Yamagishi, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/417,965

(22) PCT Filed: May 26, 2014

(86) PCT No.: PCT/JP2014/063795
§ 371 (c)(1),
(2) Date: Jan. 28, 2015

(87) PCT Pub. No.: WO2014/196393
PCT Pub. Date: Dec. 11, 2014

(65) Prior Publication Data
US 2015/0156540 A1    Jun. 4, 2015

(30) Foreign Application Priority Data

Jun. 6, 2013   (JP) .................................. 2013-119935

(51) Int. Cl.
*H04N 21/438*   (2011.01)
*H04N 21/238*   (2011.01)
(Continued)

(52) U.S. Cl.
CPC ........ *H04N 21/4384* (2013.01); *H04N 21/238* (2013.01); *H04N 21/2353* (2013.01);
(Continued)

(58) Field of Classification Search
None
See application file for complete search history.

(56) References Cited

U.S. PATENT DOCUMENTS

2009/0168902 A1   7/2009   Kisoda et al.
2012/0023254 A1*  1/2012   Park .................... H04L 47/2416
                                                                  709/231
(Continued)

FOREIGN PATENT DOCUMENTS

EP          2733936 A1    5/2014
JE   WO 2006114830 A1 *  11/2006   ............. H04H 20/26
(Continued)

OTHER PUBLICATIONS

"Information Technology—Dynamic adaptive streaming over HTTP (DASH)", May 15, 2014, ISO, Second Edition, pp. 1-152.*
(Continued)

*Primary Examiner* — Nicholas Corbo
(74) *Attorney, Agent, or Firm* — Lerner, David, Littenberg, Krumholz & Mentlik, LLP

(57) ABSTRACT

The present disclosure relates to a content supply device, a content supply method, a program, a terminal device and a content supply system that are configured to be capable of realizing rapid zapping between channels in DASH.

The content supply device of the present disclosure supplies a plurality of items of streaming data with differing attributes, which is content with identical detail, to the same channel, and is provided with a supply portion that divides the streaming data into minimum units when the reception of streaming data is switched according to a timing that is made uniform with other channels, and supplies the streaming data to a reception side through a network, and a metafile generation portion that generates metafiles for the reception side to receive the streaming data that is supplied in the minimum units, which show that the streaming data is for zapping.

(Continued)

The present disclosure can be applied to a system that performs streaming distribution of content.

13 Claims, 12 Drawing Sheets

(51) Int. Cl.

| | | |
|---|---|---|
| H04N 21/231 | (2011.01) | |
| H04N 21/235 | (2011.01) | |
| H04N 21/236 | (2011.01) | |
| H04N 21/2385 | (2011.01) | |
| H04N 21/61 | (2011.01) | |
| H04N 21/643 | (2011.01) | |
| H04N 21/845 | (2011.01) | |
| H04N 21/8543 | (2011.01) | |
| H04N 21/858 | (2011.01) | |
| H04N 21/262 | (2011.01) | |

(52) U.S. Cl.
CPC ... *H04N 21/2385* (2013.01); *H04N 21/23106* (2013.01); *H04N 21/23614* (2013.01); *H04N 21/26258* (2013.01); *H04N 21/6125* (2013.01); *H04N 21/643* (2013.01); *H04N 21/64322* (2013.01); *H04N 21/8456* (2013.01); *H04N 21/8543* (2013.01); *H04N 21/8586* (2013.01)

(56) References Cited

U.S. PATENT DOCUMENTS

| | | | |
|---|---|---|---|
| 2012/0259994 A1* | 10/2012 | Gillies | H04L 12/1881 709/231 |
| 2014/0137168 A1 | 5/2014 | Takahashi et al. | |

FOREIGN PATENT DOCUMENTS

| | | | | |
|---|---|---|---|---|
| JP | 2004-135307 A | | 4/2004 | |
| JP | 2004135307 A | * | 4/2004 | |
| JP | WO 2013008867 A1 | * | 1/2013 | ......... H04N 21/6125 |
| WO | 2006/114830 A1 | | 11/2006 | |
| WO | 2012096372 A1 | | 7/2012 | |
| WO | 2013/008867 A1 | | 1/2013 | |

OTHER PUBLICATIONS

"Realization of uninterrupted moving picture distribution using existing Web servers", Mitsuhiro Hirabayashi, Nikkei Electronics Mar. 19, 2012, pp. 78-85.

International Search Report from International Publication PCT/JP2014/063795 mailed Jul. 29, 2014.

"Realization of uninterrupted moving picture distribution using existing Web servers", Mitsuhiro Hirabayashi, Nikkei Electronics Mar. 19, 2012.

Extended European Search Report for Application No. 14807909.8 dated Nov. 17, 2016.

* cited by examiner

FIG. 6

```
<MPD ..... >
<Period..... >
<AdaptationSet>
<Representation..... >
......
<BaseURL>http://example.com/counter-10mn_avc_dash.mp4</BaseURL>
<SegmentList..... >
......
<SegmentURL mediaRange="795-83596"/>
<SegmentURL mediaRange="83597-166046"/>
<SegmentURL mediaRange="166047-248857"/>
<SegmentURL mediaRange="248858-331477"/>
......
</MPD>
```

FIG. 7

```
<MPD...NTPSynchronized = "true" SegmentAlignedGroupID = "GROUP IDENTIFIER">
  :
</MPD>
```

CONTENT SUPPLY DEVICE, CONTENT SUPPLY METHOD, PROGRAM, TERMINAL DEVICE AND CONTENT SUPPLY SYSTEM

CROSS-REFERENCE TO RELATD APPLICATION

The present application is a national phase entry under 35 U.S.C. §371 of International Application No. PCT/JP2014/063795 filed May 26, 2014, published on Dec. 11, 2014 as WO 2014/196393 A1, which claims priority from Japanese Patent Application No. JP 2013-119935 filed in the Japanese Patent Office on Jun. 6, 2013.

TECHNICAL FIELD

The present disclosure relates to a content supply device, a content supply method, a program, a terminal device and a content supply system, and more specifically, relates to a content supply device, a content supply method, a program, a terminal device and a content supply system that enable rapid zapping of content for which HTTP is performed.

BACKGROUND ART

MPEG-DASH (Moving Picture Experts Group-Dynamic Adaptive Streaming over HTTP, hereinafter, referred to as DASH) that uses the same HTTP as the HTTP for the browsing of web sites and the like is known as a moving picture distribution protocol that can be used in moving picture distribution through the Internet and is standardized internationally (for example, refer to NPL 1).

An adaptive streaming technique is realized in DASH. That is, a content supply side is made to prepare a plurality of streams that have content with identical detail, the image quality, the size of the angle of view and the like of which have been altered depending on a communication environment, and reception capacity and state of the Internet that forms a distribution pass. Meanwhile, a reception side can acquire and reproduce the most suitable streams through selection depending on the communication environment and self decoding capacity of the Internet from among a plurality of streams that the content supply side prepares.

In this manner, in DASH, metafiles, which are referred to as Media Presentation Descriptions (MPDs), are supplied to the reception side from the supply source so that the reception side can acquire streams through adaptive selection.

In MPDs, addresses (url information) of supply sources of streaming data (media data of Audio/Video/Subtitles and the like) of content that are chunked are defined. The reception side requests streaming data by accessing a predetermined server that will be the supply source of content on the basis of the url information, and the reception and reproduction of streaming data for which HTTP distribution is performed depending on the request is possible.

FIG. 1 shows an example of a configuration of a content supply system that performs streaming distribution of content on the basis of DASH.

The content supply system 10 is configured by multiple DASH clients 30 on a side that receives content being connected with a plurality of content supply devices 20 (20A, 20B and 20C in this case) on a side that supplies content, using the Internet 11.

The content supply device 20A distributes content with identical detail as a Channel A using a plurality of streams. The content supply device 20B distributes content with identical detail that differs from the content of the Channel A as a Channel B using a plurality of streams. The same applies to the content supply device 20C. Hereinafter, in cases in which it is not necessary to individually discriminate between the content supply devices 20A, 20B and 20C, the content supply devices will simply be referred to as the content supply devices 20.

The content supply devices 20 include a content management server 21, a DASH segment streamer 22, and a DASH/MPD server 23.

The content management server 21 manages content that is supplied to the DASH client 30, generates a plurality of items of streaming data with differing bit rates from content with identical detail, and outputs the streaming data to the DASH segment streamer 22. The DASH segment streamer 22 divides each item of streaming data into segments in a temporal manner, respectively saves the segments through conversion into files, and notifies the DASH/MPD server 23 of the addresses of the supply sources of the files. Furthermore, the DASH segment streamer 22 performs the HTTP distribution of the files of the segmented streaming data as an HTTP server depending on requests from the DASH client 30 on the reception side.

The DASH/MPD server 23 generates an MPD in which addresses and the like that show the supply source of files of (segments of) the plurality of items of streaming data are defined, and performs the HTTP distribution of the MPD depending on requests from the DASH client 30 of the reception side.

The DASH client 30 makes a request from the DASH/MPD server 23, requests streaming data from the DASH segment streamer 22 on the basis of the MPD for which HTTP distribution is performed, and receives and reproduces files for which HTTP distribution is performed depending on the requests.

Additionally, in place of the DASH/MPD server 23 or the DASH segment streamer 22, a cache server (not shown in the drawings) is also provided on the Internet 11 so that the HTTP distribution of cached MPDs and segmented streaming data is performed.

CITATION LIST

Non Patent Literature

NPL 1: "Realization of uninterrupted moving picture distribution using existing Web servers", Mitsuhiro Hirabayashi, NIKKEI ELECTRONICS 2012.3.19

SUMMARY OF INVENTION

Technical Problem

As mentioned above, an adaptive streaming technique that uses HTTP distribution is realized in DASH, and in the configuration of FIG. 1, the simultaneous distribution to the reception side of a plurality of items of content with differing detail is made possible by preparing a plurality of channels (content supply devices 20).

In this manner, in a case in which it is possible to simultaneously supply a plurality of items of content with differing detail, it is assumed that so-called zapping (an operation of retrieving content to be viewed by sequentially switching channels in a short period of time) is performed in the same manner as when a viewer is viewing a television broadcast. Switching between channels in DASH is performed in subsegment units in which segment units or segments have been further subdivided. Additionally, in the following continuous description, the switching between channels in DASH refers to switching that is performed in segment units.

FIG. 2 and FIG. 3 show the preparation of three streams (Representations) with differing bit rates, which are respectively content with identical detail in Channels A, B and C of DASH, and show an aspect of switching when zapping between channels.

Additionally, since a segment length (a length of time) in DASH is arbitrary, the segment lengths do not necessarily coincide between channels. In addition, reproduction initiation time points of the leading ends of segments of content do not necessarily coincide between channels.

FIG. 2 is an example of a case of the segment length between channels not coinciding, and reproduction initiation time points of the leading ends of segments of content between channels not coinciding.

In this case, even if a user of the DASH client 30 designates switching (zapping) to the Representation B2 of the Channel B before the T1 of the DASH client temporal axis while viewing the Representation A2 of the Channel A, switching is delayed until the T2, which is a juncture of the segments of the Representation B2. Furthermore, even if switching to the Representation C2 of the Channel C is designated before the T3 while viewing the Representation B2 of the Channel B, switching is delayed until the T4, which is a juncture of the segments of the Representation C2.

FIG. 3 is an example of a case of the segment length between channels not coinciding, and reproduction initiation time points of the leading ends of segments of content between channels coinciding by synchronizing with the NTP temporal axis.

In this case, even if a user of the DASH client 30 designates switching to the Representation B2 of the Channel B before the T1 of the NTP temporal axis while viewing the Representation A2 of the Channel A, switching is delayed until the T2, which is a juncture of the segments of the Representation B2. Furthermore, even if switching to the Representation C2 of the Channel C is designated before the T3 while viewing the Representation B2 of the Channel B, switching is delayed until the T4, which is a juncture of the segments of the Representation C2.

In the abovementioned manner, if the switching of streams is performed between channels in DASH, surplus delays are caused. Accordingly, in this case, it is not possible to perform rapid zapping between channels.

Additionally, if the segment length of the stream of each channel is greatly reduced, it is possible to inhibit the generation of the abovementioned delays. However, in such a case, since the amount of data of the stream is increased due to a deterioration coding efficiency, and therefore, a wider communication band is necessary, there is a concern that an excessive load will be applied to the Internet 11 leading to a deterioration in service quality.

Therefore, an object of the present disclosure is to provide a content supply device in which it is possible to realize rapid zapping between channels in DASH.

Solution to Problem

A content supply device, which is a first aspect of the present disclosure, supplies a plurality of items of streaming data with differing attributes, which is content with identical detail, to the same channel according to an adaptive streaming technique, and includes a supply portion that divides the streaming data into minimum units when the reception of streaming data is switched according to a timing that is made uniform with other channels, and supplies the streaming data in the minimum units to a reception side through a network, and a metafile generation portion that generates metafiles for the reception side to receive the streaming data that is supplied in the minimum units, which show that the streaming data is for zapping.

The supply portion may divide the streaming data into the minimum units according to a timing that is made uniform with other channels that belong to the same group.

The supply portion may synchronize with an NTP temporal axis, match leading ends of the minimum units with other channels that belong to the same group, and divide the streaming data into the minimum units using a length of time that is made uniform with other channels that belong to the same group.

The supply portion may divide the streaming data for zapping into the minimum units using a length of time that is shorter than the minimum units of the streaming data for viewing.

The metafile generation portion may generate expanded MPDs as the metafiles.

The content supply device, which is a first aspect of the present disclosure, may further include an accumulator portion that accumulates the metadata for zapping, and supplies the metadata for zapping to the reception side.

The metafile generation portion may generate the MPDs into which MPD/@NTPSynchronized attributes and MPD/SegmentAlignedGroupID attributes have been introduced as the metafiles, and the accumulator portion may accumulate the metadata for zapping on the basis of the MPD/@NTPSynchronized attributes and the MPD/SegmentAlignedGroupID attributes.

The metafile generation portion may generate the MPDs into which MPD/@forZapping attributes have been introduced as the metafiles, and the accumulator portion may accumulate the metadata for zapping on the basis of the MPD/@forZapping attributes.

The metafile generation portion may define at least one of a length of time of the minimum units or a maximum length of time of the streaming data in the metadata as the metafiles, and the accumulator portion may accumulate the metadata for zapping on the basis of at least one of the length of time of the minimum units or the maximum length of time of the streaming data.

A content supply method of a content supply device, which is a first aspect of the present disclosure, and which supplies a plurality of items of streaming data with differing attributes, which is content with identical detail, to the same channel according to an adaptive streaming technique, includes a supply step of dividing the streaming data into minimum units when the reception of streaming data is switched according to a timing that is made uniform with other channels, and supplying the streaming data in the minimum units to a reception side through a network, and a metafile generation step of generating metafiles for the reception side to receive the streaming data that is supplied in the minimum units, which show that the streaming data is for zapping, which are executed by the content supply device.

A program, which is a first aspect of the present disclosure, causes a computer that supplies a plurality of items of streaming data with differing attributes, which is content with identical detail, to the same channel according to an adaptive streaming technique, to function as a supply portion that divides the streaming data into minimum units when the reception of streaming data is switched according to a timing that is made uniform with other channels, and supplies the streaming data in the minimum units to a reception side through a network, and a metafile generation portion that generates metafiles for the reception side to receive the streaming data that is supplied in the minimum units, which show that the streaming data is for zapping.

In the first aspect of the present disclosure, streaming data is divided into minimum units when the reception of streaming data is switched according to a timing that is made uniform with other channels, and the minimum units are supplied to a reception side through a network. In addition, metafiles for the reception side to receive the streaming data that is supplied in the minimum units, which show that the streaming data is for zapping, are generated.

A terminal device, which is a second aspect of the present disclosure, that receives streaming data that is supplied from a content supply device that supplies a plurality of items of the streaming data with differing attributes, which is content with identical detail, to the same channel according to an adaptive streaming technique, in which the content supply device includes a supply portion that divides the streaming data into minimum units when the reception of streaming data is switched according to a timing that is made uniform with other channels, and supplies the streaming data in the minimum units to a reception side through a network and a metafile generation portion that generates metafiles for the terminal device to receive the streaming data that is supplied in the minimum units, which show that the streaming data is for zapping, and acquires the metafiles for zapping, and switches the reception of the streaming data that is respectively supplied from different channels on the basis of the acquired metafiles for zapping.

In the second aspect of the present disclosure, metafiles for zapping are acquired, and the reception of the streaming data that is respectively supplied from different channels is switched on the basis of the acquired metafiles for zapping.

A content supply device, which is a third aspect of the present disclosure, that is formed from a content supply device that supplies a plurality of items of the streaming data with differing attributes, which is content with identical detail, to the same channel according to an adaptive streaming technique, and a terminal device that receives the streaming data, in which the content supply device includes a supply portion that divides the streaming data into minimum units when the reception of streaming data is switched according to a timing that is made uniform with other channels, and supplies the streaming data in the minimum units to a reception side through a network, and a metafile generation portion that generates metafiles for the terminal device to receive the streaming data that is supplied in the minimum units, which show that the streaming data is for zapping. In addition, the terminal device acquires the metafiles for zapping, and switches the reception of the streaming data that is respectively supplied from different channels on the basis of the acquired metafiles for zapping.

In the third aspect of the present disclosure, due to the content supply device, streaming data is divided into minimum units when the reception of streaming data is switched according to a timing that is made uniform with other channels, and the streaming data is supplied in the minimum units to a reception side through a network. In addition, metafiles for the reception side to receive the streaming data that is supplied in the minimum units, which show that the streaming data is for zapping, are generated. In addition, due to the terminal device, the metafiles for zapping are acquired, and the reception of the streaming data that is respectively supplied from different channels is switched on the basis of the acquired metafiles for zapping.

Advantageous Effects of Invention

According to aspects 1 to 3 of the present disclosure, it is possible to realize rapid zapping between channels in DASH.

BRIEF DESCRIPTION OF DRAWINGS

FIG. 6 is a view that shows an example of MPDs defined in XML format.

FIG. 7 is a view that shows an example of expanded MPDs defined in XML format.

DESCRIPTION OF EMBODIMENTS

Hereinafter, preferred aspects (hereinafter, referred to as embodiments) for implementing the present disclosure will be described, but prior to the description, a summary of the present disclosure will be described with reference to FIG. 4.

Figure 1:
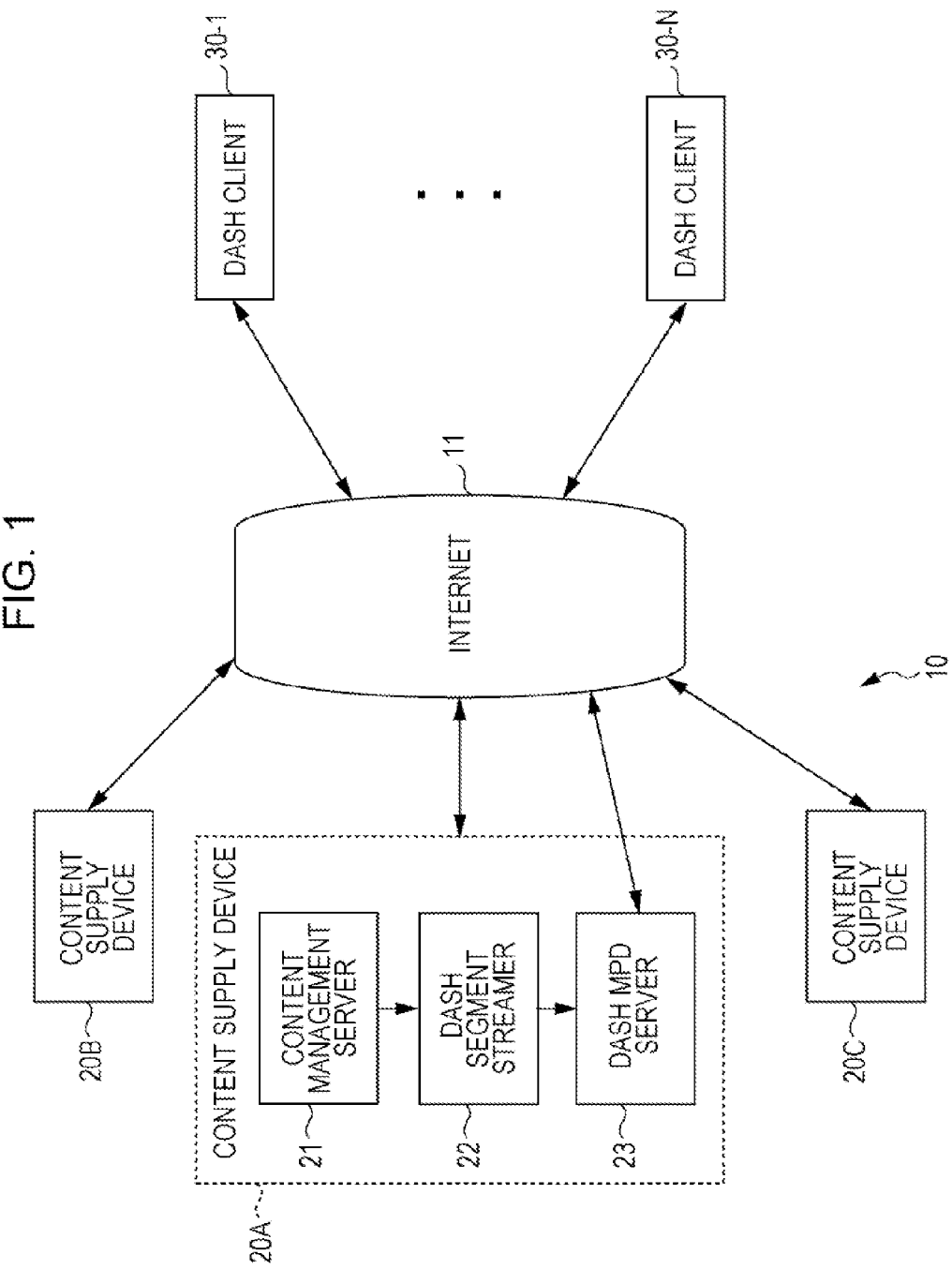
FIG. 1 is a block diagram that shows an example of a configuration of a content supply system of the related art.
Figure 2:
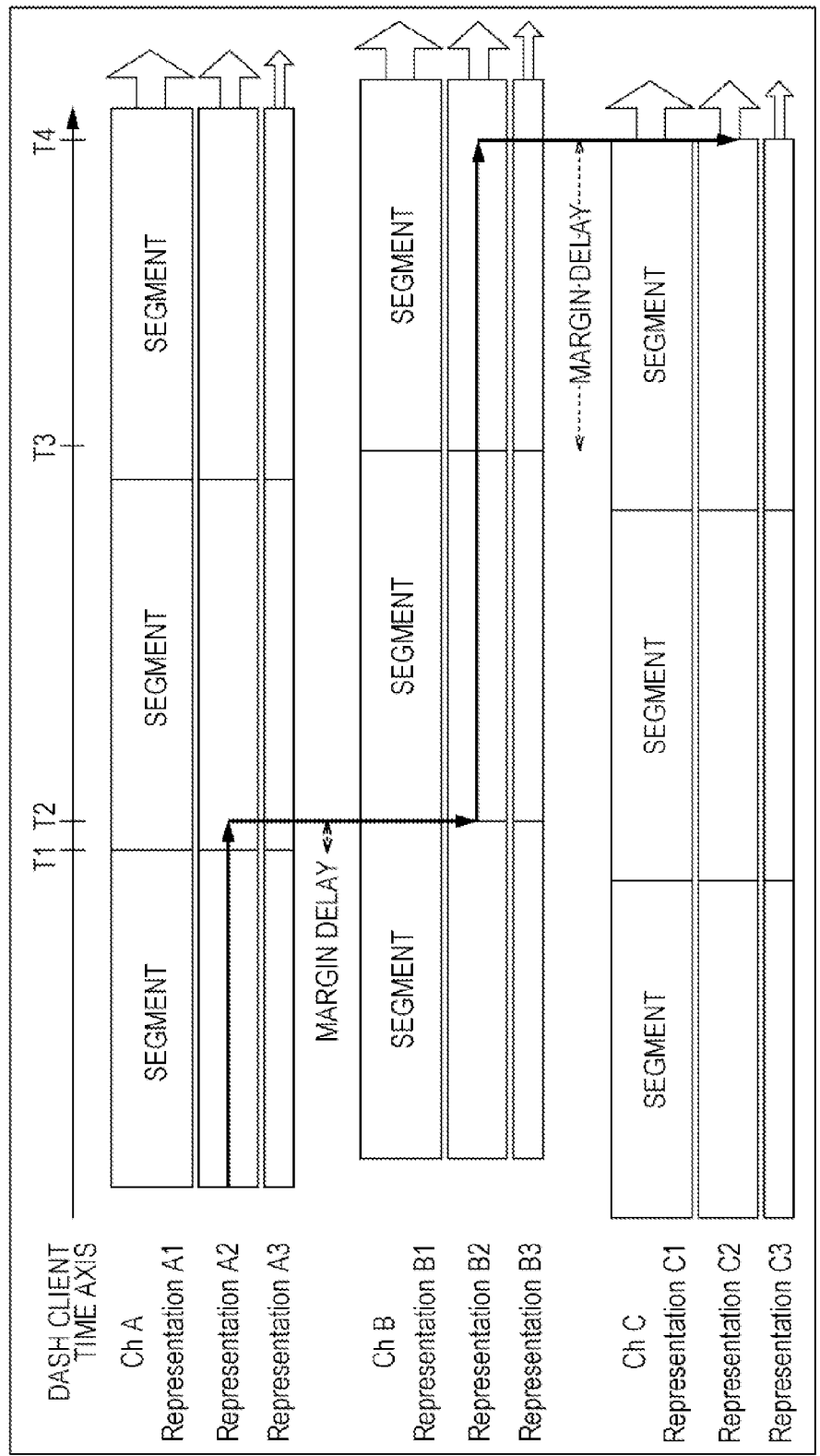
FIG. 2 is a view that describes a delay that is caused by switching between channels.
Figure 3:
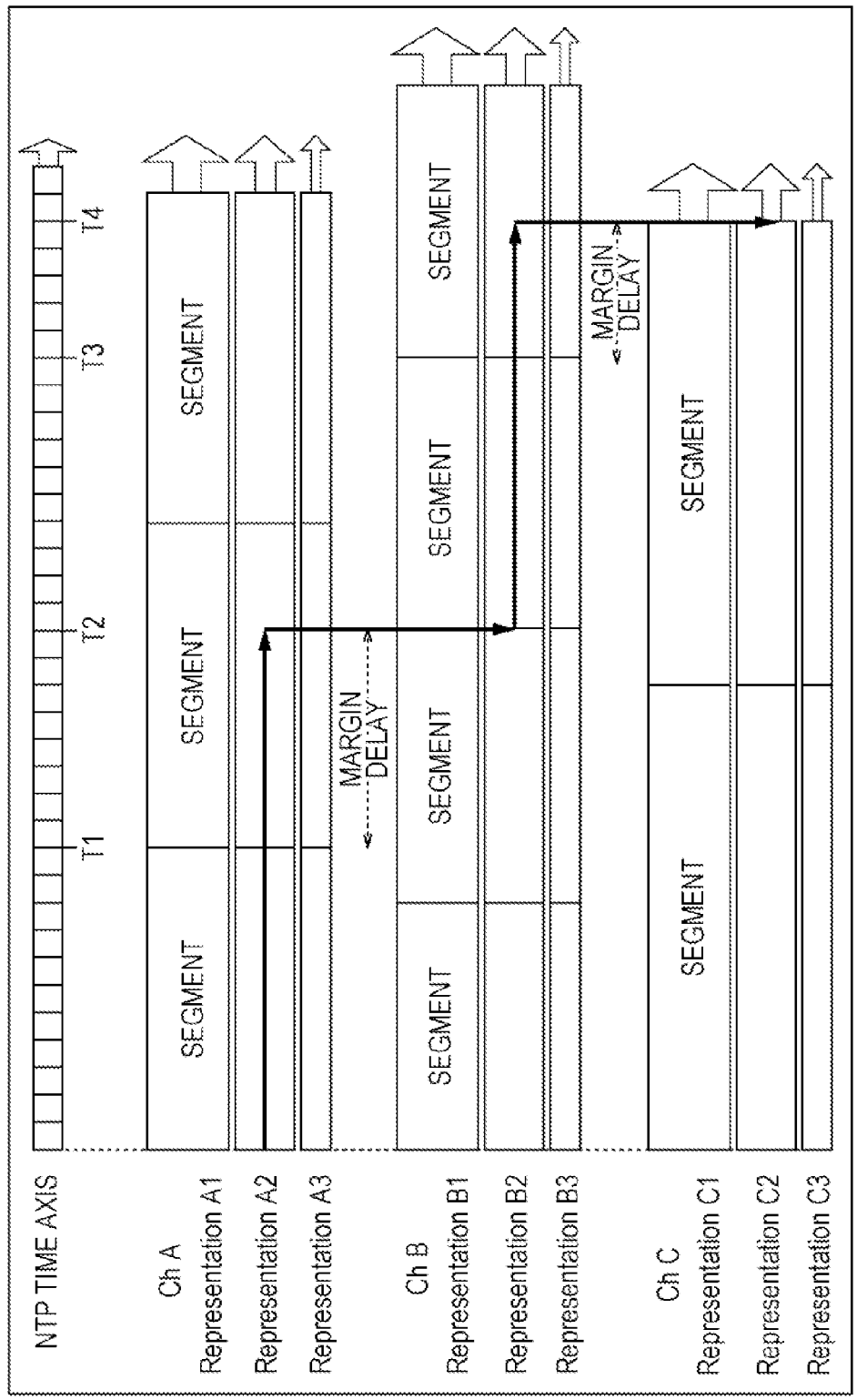
FIG. 3 is a view that describes a delay that is caused by switching between channels.
Figure 4:
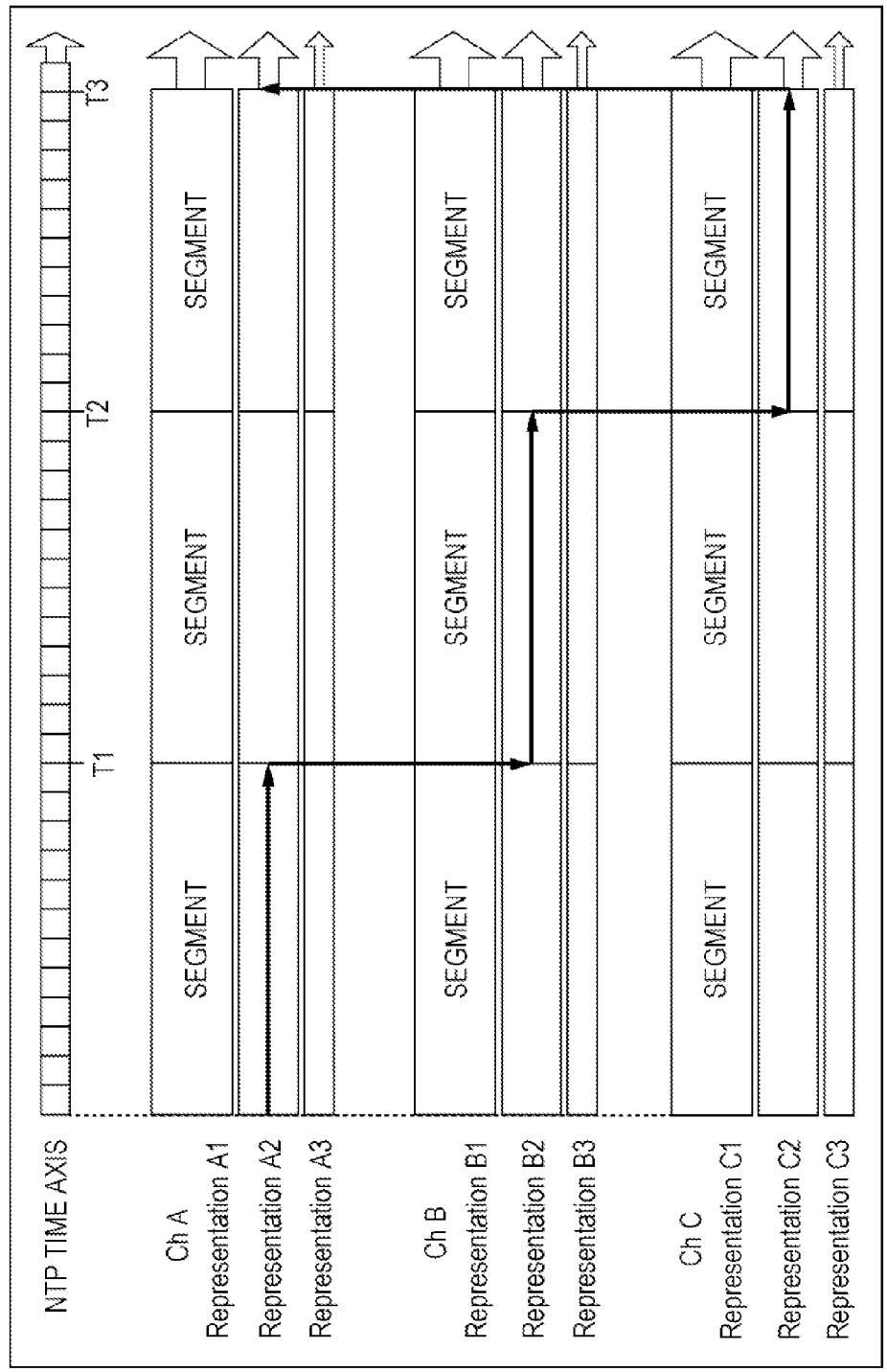
FIG. 4 is a view that describes the main parts of the present disclosure.

FIG. 4 shows an aspect of switching when zapping between multiple channels that are prepared by a content supply system, which is the embodiment of the present disclosure.

The drawing also shows content that respectively differs in Channels A, B and C, being distributed, and three streams (Representations) with differing bit rates in each channel, being prepared.

In the content supply system in which the present disclosure is applied, in addition to divisions of segments of content being synchronized with an NTP temporal axis, a segment length of each channel that belongs to a predetermined group is made uniform with a common length of time. Furthermore, starting points of media reproduction time points (MPD/@availabilityStartTime+Period/@start) of leading ends of segments are established so as to coincide on the NTP temporal axis.

As a result of establishing in this manner, as shown in FIG. 4, if a viewer that is using the content supply system designates switching to the Representation B2 of the Channel B before the T1 of the DASH client temporal axis while viewing the Representation A2 of the Channel A, switching is performed in T1, which is a division of the segment of the Representation A2, and is also a division of the segment of the Representation B2. In addition, if switching to the Representation C2 of the Channel C is designated before the T2 while viewing the Representation B2 of the Channel B, switching is performed in T2, which is a division of the segment of the Representation B2, and is also a division of the segment of the Representation C2. Furthermore, if switching to the Representation A2 of the Channel A is designated before the T3 while viewing the Representation C2 of the Channel C, switching is performed in T3, which is a division of the segment of the Representation C2, and is also a division of the segment of the Representation A2.

Additionally, in the content supply system, which is an embodiment of the present disclosure, it is configured so that one or more streams for zapping and two or more streams for viewing are prepared for content with identical detail in each channel. In addition, in each channel that belongs to the same group, it is configured so that the segment length of each channel coincides with the streams for zapping, and reproduction initiation time points of the leading ends of segments of content in each channel coincide by synchronizing with the NTP time point.

As a result of this, it becomes it is possible to perform zapping between channels that belong to the same group rapidly without causing a surplus delay.

[Configuration Example of Content Supply System]

Figure 5:
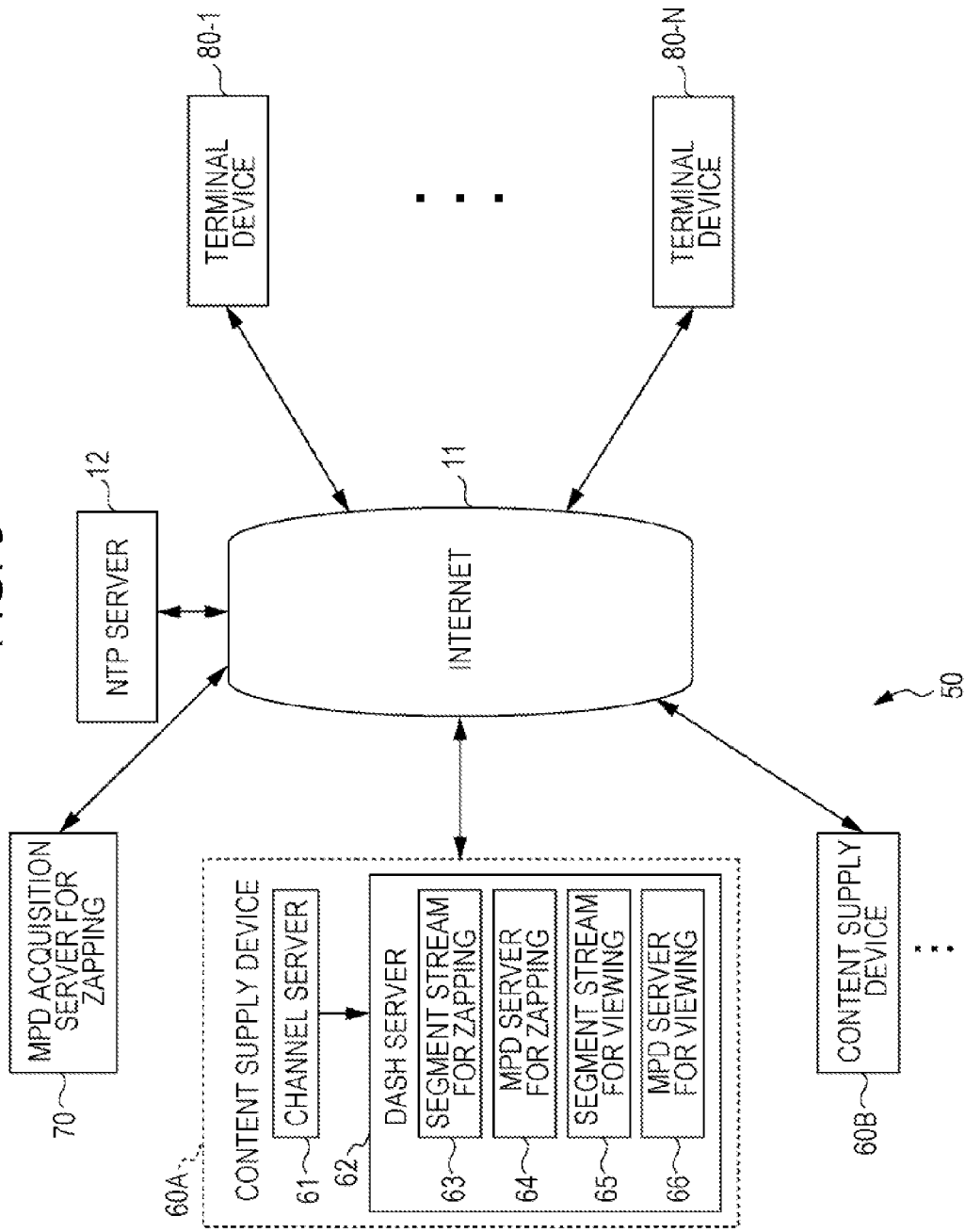
FIG. 5 is a block diagram that shows a configuration example of a content supply system in which the present disclosure is applied.

FIG. 5 shows a configuration example of a content supply system in which the present disclosure is applied.

The content supply system 50 is configured by connecting a plurality of content supply devices 60, an MPD acquisition portal for zapping 70, and multiple terminal devices 80 that correspond to each channel using the Internet 11.

Additionally, on the Internet 11, there is an NTP server 12 that provides system time point information according to the UTC time format. Each content supply device 60 and each terminal device 80 respectively act in synchronization with an NTP temporal axis according to system time point information that is supplied from the NTP server 12.

A content supply device 60A that corresponds to the Channel A includes a channel server 61 and a DASH server 62.

The channel server 61 manages content source data that is distributed as the channel A, generates a plurality of items of streaming data (one or more item of streaming data for zapping and two or more items of streaming data for viewing) with identical detail, the bit rate of which differ, from the source data, and supplies the streaming data to the DASH server 62.

The DASH server 62 includes a segment streamer for zapping 63, an MPD server for zapping 64, a segment streamer for viewing 65 and an MPD server for viewing 66.

The segment streamer for zapping 63 divides the one or more items of streaming data for zapping into periods in a temporal manner, further separates the periods into segments (segments), and respectively converts the segments into files and saves the files. Additionally, a segment length of the streaming data for zapping is shorter than a segment length of the streaming data for viewing, and therefore, coincides with other channels that belong to the same group and a common length of time. In addition, since the segment streamer for zapping 63 acts in synchronization with the NTP temporal axis, the divisions of the segments also become in synchronization with the NTP temporal axis.

Furthermore, the segment streamer for zapping 63 notifies the MPD server for zapping 64 of addresses that will be supply sources of files that are to be saved. In addition, the segment streamer for zapping 63 performs HTTP distribution of the files of the segmented streaming data depending on requests from the terminal device 80 using the Internet 11.

The MPD server for zapping 64 generates expanded MPDs for zapping (hereinafter, referred to as MPDs for zapping. To be described in more detail later) that are necessary in order for a terminal device 80 side to receive the streaming data for zapping. Additionally, within a group that the channel of the content supply device 60 belongs to, starting points of media reproduction time points (MPD/@availabilityStartTime+Period/@start) of leading ends of segments coincide with the NTP temporal axis.

In addition, the MPD server for zapping 64 supplies the MPDs for zapping to the MPD acquisition portal for zapping 70 depending on crawl of the MPD acquisition portal for zapping 70.

The segment streamer for viewing 65 divides the plurality of items of streaming data for viewing into periods in a temporal manner, further separates the periods into segments, and respectively converts the segments into files and saves the files. Additionally, divisions of the segments of the streaming data for viewing is configured to coincide with divisions of the segments of the streaming data for zapping. However, a segment length of the streaming data for viewing can be set to be longer than a segment length of the streaming data for zapping. As a result of this, in addition to just being able to encode the streaming data for zapping efficiently, it is possible to perform switching between the streaming data for zapping and the streaming data for viewing rapidly.

Furthermore, the segment streamer for viewing 65 notifies the MPD server for viewing 66 of addresses that will be supply sources of files that are to be saved. In addition, the segment streamer for viewing 65 performs HTTP distribution of the files of the segmented streaming data depending on requests from the terminal device 80 using the Internet 11.

The MPD server for viewing 66 generates MPDs for viewing that are necessary in order for the terminal device 80 side to receive the streaming data for viewing, and performs HTTP distribution of the MPDs for zapping depending on requests from the terminal device 80 using the Internet 11.

Additionally, MPDs for zapping that are generated by the MPD server for zapping 64, and MPDs for viewing that are generated by the MPD server for viewing 66 correspond to content with identical detail, and for example, the association the MPDs is made clear by a URL or the like of an acquisition point. More specifically, for example, in a case in which a URL of an acquisition point of the MPDs for zapping is set as http://a.com/channel_1.forZapping.mpd, a URL of an acquisition point of the MPDs for viewing is set as http://a.com/channel_1.mpd or the like.

Since a content supply device 60B that corresponds to the Channel B is configured in the same manner as the content supply device 60A, the description thereof has been omitted. Additionally, there may also be a plurality of content supply devices 60X (not shown in the drawings) that correspond to Channels X other than the Channels A and B.

The MPD acquisition portal for zapping 70 accumulates MPDs for zapping by crawling the content supply device 60 of each channel depending on a query API that requests MPDs for zapping from the terminal device 80, and transmits the MPDs for zapping to the terminal device 80. Additionally, in a case in which MPDs for zapping are not generated by the content supply device 60 of each channel, the MPD acquisition portal for zapping 70 accumulates MPDs for viewing that satisfy predetermined conditions (to be described later), and transmits the MPDs for viewing to the terminal device 80.

[Expansion of MPDs]

Next, MPDs in DASH, and the expansion thereof will be described.

In MPDs, information that is related to content (Media) is divided into Periods. In each Period, a plurality of Representations that are formed from information that is related to streaming data that has identical detail, but in which stream attributes such as the bit rate image quality and size of the angle of view have been altered. Information that is related to Segments, into which Periods have been further separated in a temporal manner, is stored in a Representation.

FIG. 6 shows an example in which a structure of Representations and below is defined in XML format.

In the drawing, the "http://example.com/counter-10mn_avc_dash.mp4" that is defined under the MPD/Period/AdaptationSet/Representation/BaseURL shows an address of a supply source of a file in which a plurality of segments have been converted into a file together.

In addition, the MPD/Period/AdaptationSet/Representation/SegmentList/SegmentURL/@mediaRange shows a byte range of segmented streaming data in the file.

For example, MPD/Period/AdaptationSet/Representation/SegmentList/SegmentURL/@mediaRange="795-83596" shows that a byte range from byte number 795 to byte number 83596 in the file is a first item of segmented streaming data.

Therefore, when the terminal device 40 acquires the first item of segmented streaming data, a HTTP request that specifies a mediaRange of "795-83596" as a Range header in addition to the url "http://example.com/counter-10mn_avc_dash.mp4" of the file, may be performed. An HTTP request in this instance is as follows.

GET /counter-10mn_avc_dash.mp4 HTTP/1.1
Host: example.com Range: bytes=795-83596

Next, FIG. 7 shows an example in which a structure directly below expanded MPDs is defined in XML format as the MPDs for zapping.

That is, in expanded MPDs, an MPD/@NTPSynchronized (boolean type, value is true/false) attribute and an MPD/@SegmentAlignedGroupID (group identifier) attribute are newly introduced directly below MPD.

In the MPD/@NTPSynchronized attribute, either true or false that represent whether or not divisions of the segments of streaming data of the MPD are synchronized with the NTP temporal axis, is defined. In this case, since the segment streamer for zapping 63 is acting in synchronization with the NTP temporal axis, the value of the MPD/@NTPSynchronized attribute becomes true.

In the MPD/@SegmentAlignedGroupID attribute, an identifier of a group that a channel, which coincides with the division of the segment of streaming data, belongs to is defined.

Therefore, in the MPD acquisition portal for zapping 70, MPDs (MPDs for zapping) for which the MPD/@NTPSynchronized attribute is true, and the MPD/@SegmentAlignedGroupID attribute is the same group identifier may be accumulated depending on a query API such as that below Http://MPDPortal.com/getMPDforZapping that requests the MPDs for zapping from the terminal device 80. Since the divisions of segments are made uniform by synchronizing with the NTP temporal axis, rapid zapping is possible between channels that correspond to the accumulated MPDs for zapping.

In addition, display in the drawings has been omitted, but in the MPDs for zapping, within a group that the channel of the content supply device 60 belongs to, starting points of media reproduction time points (MPD/@availabilityStartTime+Period/@start) of leading ends of segments coincide with the NTP temporal axis.

Furthermore, in the MPDs for zapping and the MPDs for viewing, the definition of at least one of a segmentBase/@duration attribute that stores a value that represents segment length, and an MPD/@maxSegmentDuration attribute that stores a value that represents maximum segment length is essential.

If one of these two attributes is defined, it is possible to accumulate MPDs for viewing that have not been expanded, that is, MPDs for viewing into which the MPD/@NTPSynchronized attribute and the MPD/@SegmentAlignedGroupID attribute have not been introduced, as the MPDs for zapping. More specifically, for example, if the terminal device 80 requests MPDs from the MPD acquisition portal for zapping 70 using a query API such as that below, it is possible to cause accumulate MPDs for viewing with a segment length (an expected segment length) that satisfy a predetermined conditions to be accumulated. Additionally, in the following example, a segment length of two seconds or less is set as the expected segment length.

Http://MPDPortal.com/
getMPD?expectedSegmentSizeLimit="P T2S"

Since the segment length is a comparatively short period of time (two seconds in the abovementioned example) rapid zapping between channels that correspond to accumulated MPDs for viewing that correspond to the expected segment length.

Additionally, in place of introducing the MPD/@NTPSynchronized attribute and the MPD/@SegmentAlignedGroupID attribute, an MPD/forZapping (boolean type, value is true/false) that shows whether or not the MPDs are MPDs for zapping, may be introduced.

[Action of Content Supply System 50]

Next an action of the content supply system 50 will be described.

Figure 8:
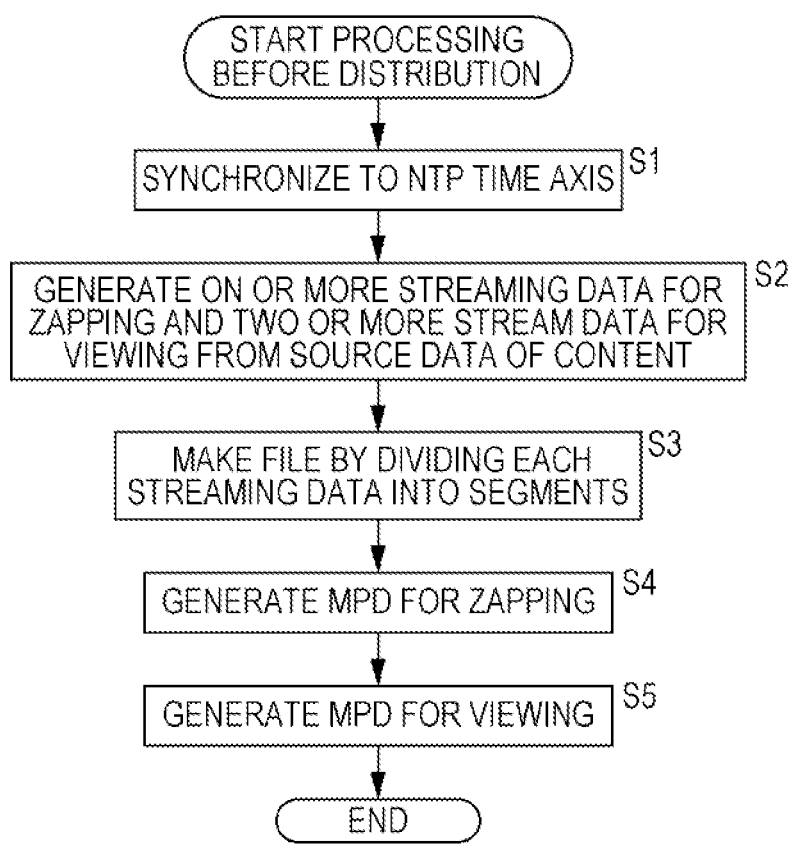
FIG. 8 is a flowchart that describes processes prior to distribution.

FIG. 8 is a flowchart that describes processes that each content supply device 60 performs in advance (hereinafter, referred to as processes prior to distribution) in order to distribute content.

In Step S1, each content supply device 60 is caused to synchronize the system time point thereof with the NTP temporal axis according to system time point information that is provided from the NTP server 12. As a result of this, the segment streamer for zapping 63 or the like of the content supply device 60 acts in synchronization with the NTP temporal axis.

In Step S2, the channel server 61 creates a plurality of items of streaming data (one or more item of streaming data for zapping and two or more items of streaming data for viewing), the bit rate of which differ, from source data of content that is distributed as the Channel A, and supplies the streaming data to the DASH server 62.

In Step S3, the segment streamer for zapping 63 divides the one or more items of streaming data for zapping into periods in a temporal manner, further separates the periods into segments with a length of time (a segment length) that coincides within a group that the content supply device 60 belongs to, and respectively converts the segments into files and saves the files. In addition, the segment streamer for zapping 63 notifies the MPD server for zapping 64 of addresses that will be supply sources of files that are to be saved. In parallel with this, the segment streamer for viewing 65 divides the plurality of items of streaming data for viewing into periods in a temporal manner, further separates the periods into segments, and respectively converts the segments into files and saves the files. In addition, the segment streamer for viewing 65 notifies the MPD server for viewing 66 of addresses that will be supply sources of files that are to be saved.

In Step S4, the MPD server for zapping 64 generates MPDs for zapping that are necessary in order for the terminal device 80 side to receive the streaming data for zapping. In Step S5, the MPD server for viewing 66 generates MPDs for viewing that are necessary in order for the terminal device 80 side to receive the streaming data for viewing. This concludes the description of the processes prior to distribution.

Figure 9:
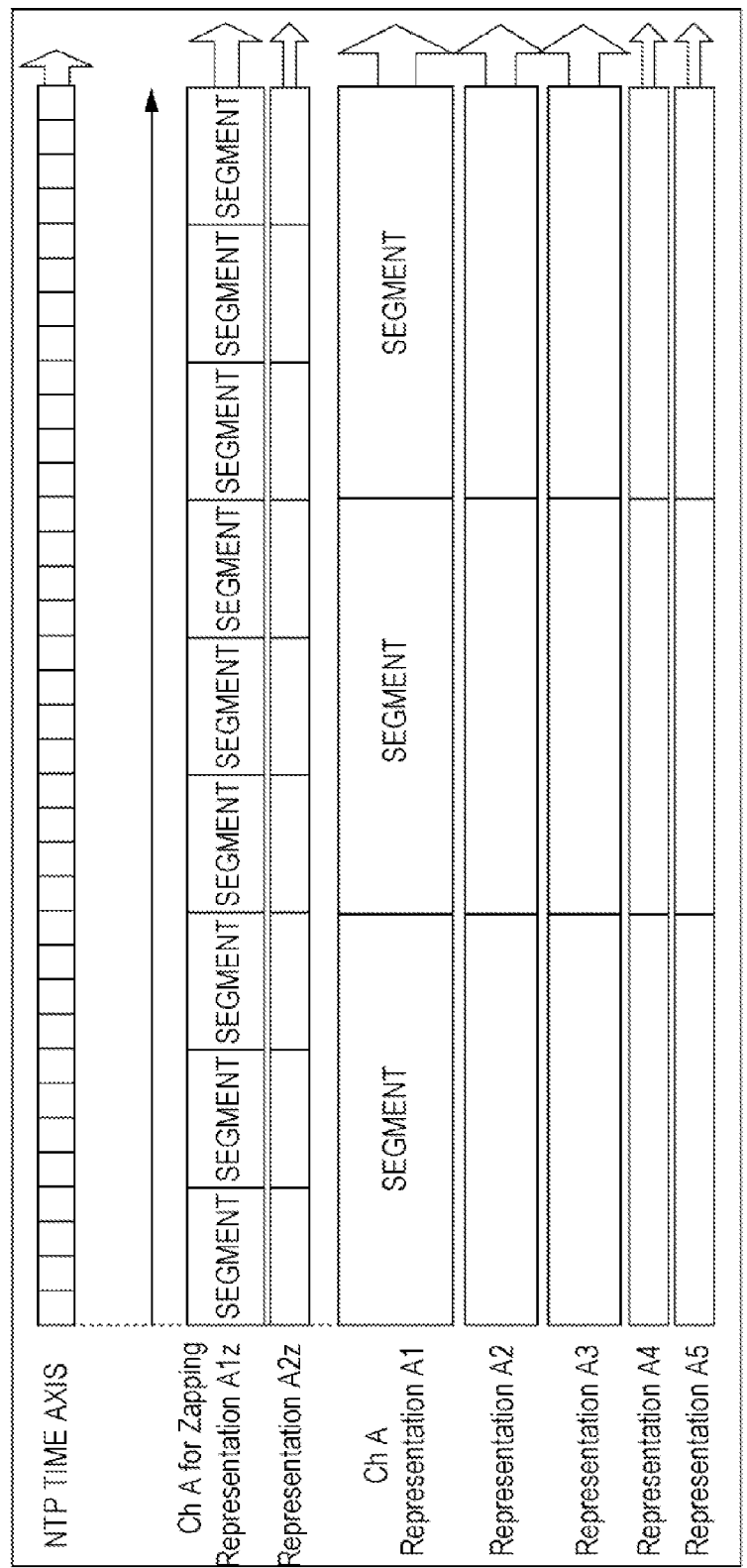
FIG. 9 is a view that displays differences in segment length for zapping and segment length for viewing.

FIG. 9 shows division of segments that are generated by the processes prior to distribution that are described above.

As shown in the drawing, in the content supply device 60A that corresponds to the Channel A, one or more item of streaming data for zapping (two items of streaming data in FIG. 9) and two or more items of streaming data for viewing (five items of streaming data in FIG. 9) are generated, and the divisions of these segments are synchronized with the NTP temporal axis.

In addition, the divisions of segments of streaming data for zapping coincide with the divisions of segments of streaming data for zapping of other channels (not shown in the drawings) that belong to the same group.

Figure 10:
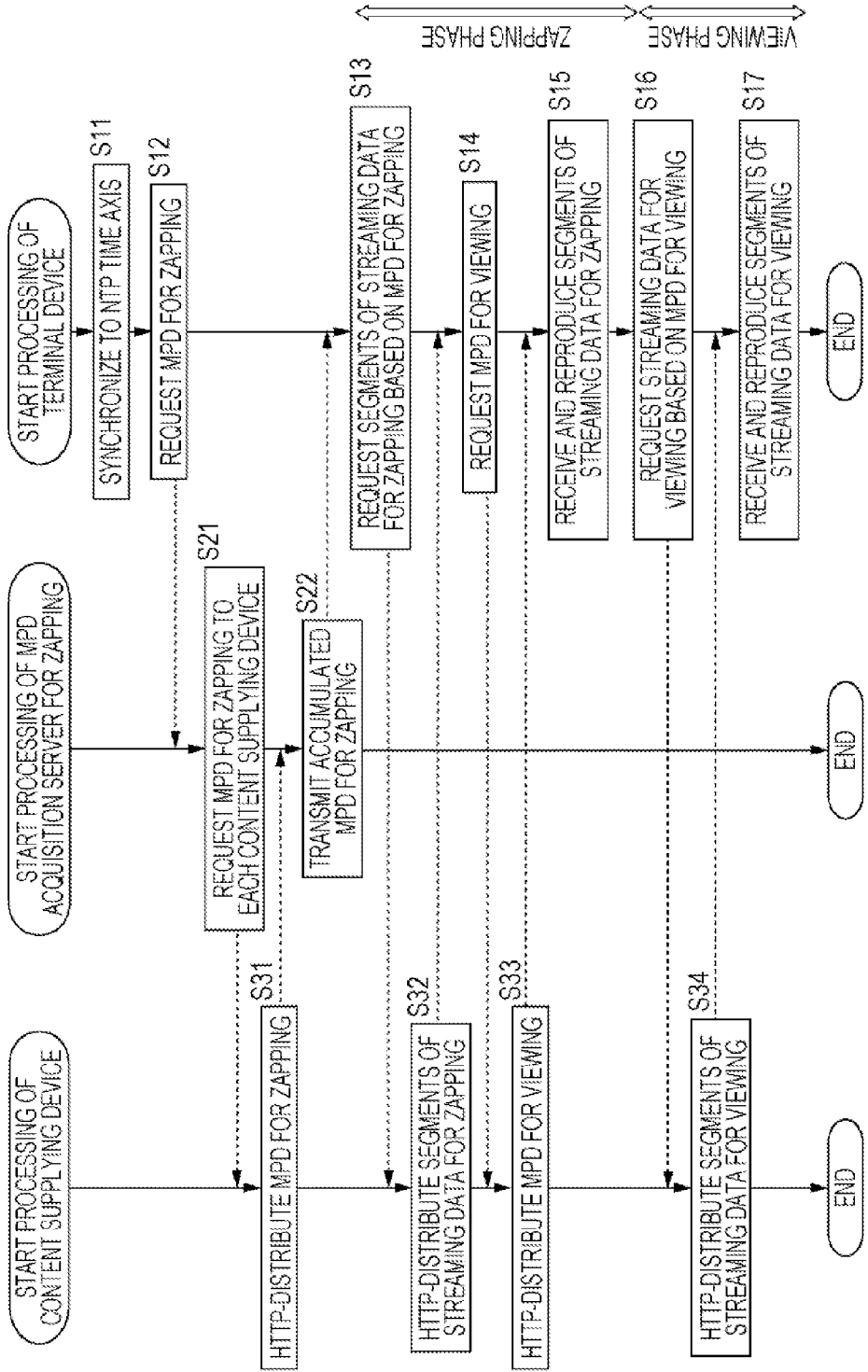
FIG. 10 is a flowchart that describes a series of processes of the content supply system.

Next, FIG. 10 is a flowchart that describes a series of processes in which the terminal device 80 transitions into a viewing phase after a content zapping phase (hereinafter, referred to as a series of processes).

Step S11, the terminal device 80 is caused to synchronize the system time point thereof with the NTP temporal axis according to system time point information that is provided from the NTP server 12. In Step S12, the terminal device 80 requests MPDs for zapping from the MPD acquisition portal for zapping 70. That is, the terminal device 80 transmits a query API in order to ask for a crawl of the MPDs for zapping.

In Step S21, depending on this query API, the MPD acquisition portal for zapping 70 connects to the MPD server for zapping 64 of each content supply device 60, and requests MPDs for zapping (MPDs for which the MPD/@NTPSynchronized attribute is true, and the MPD/@SegmentAlignedGroupID attribute is the same group identifier). Depending on this request, in Step S31, the MPD server for zapping 64 of each content supply device 60 performs HTTP distribution of the MPDs for zapping to the MPD acquisition portal for zapping 70. In Step S22, the MPD acquisition portal for zapping 70 transmits the accumulated MPDs for zapping to the terminal device 80 from which there was a request.

A terminal device 80 that receives MPDs for zapping enters a zapping phase. In Step S13, the terminal device 80 requests segments of streaming data for zapping from the segment streamer for zapping 63 of the content supply device 60 on the basis of the MPDs for zapping. Depending on this request, in Step S32, the segment streamer for zapping 63 performs HTTP distribution of the requested segments. In Step S15, the terminal device 80 receives the segments of streaming data for zapping for which HTTP distribution was performed, and reproduces the segments.

During the zapping phase, by repeating the processes of Step S13 and Step S15, it is possible for the terminal device 80 to perform rapid zapping between channels that belong to the same group.

Additionally, the terminal device 80 is set so that the MPDs for viewing are acquired during the zapping phase. More specifically, in Step S14, the MPDs for viewing are requested from the MPD server for viewing 66, and depending on this request, the MPD server for viewing 66 receives the MPDs for viewing for which HTTP distribution is to be performed as Step S33.

A terminal device 80 that receives MPDs for viewing transitions from the zapping phase to the viewing phase. In Step S16, the terminal device 80 requests segments of streaming data for viewing from the segment streamer for viewing 65 of the content supply device 60 on the basis of the MPDs for viewing. Depending on this request, in Step S34, the segment streamer for viewing 65 performs HTTP distribution of the requested segments. In Step S17, the terminal device 80 receives the segments of streaming data for viewing for which HTTP distribution was performed, and reproduces the segments.

Additionally, after this, it is possible to return to the zapping phase from the viewing phase, and then transition to the viewing phase again. This concludes the description of the series of processes. According to the abovementioned series of processes, it becomes it is possible to perform zapping between channels that belong to the same group rapidly without causing a surplus delay.

Figure 11:
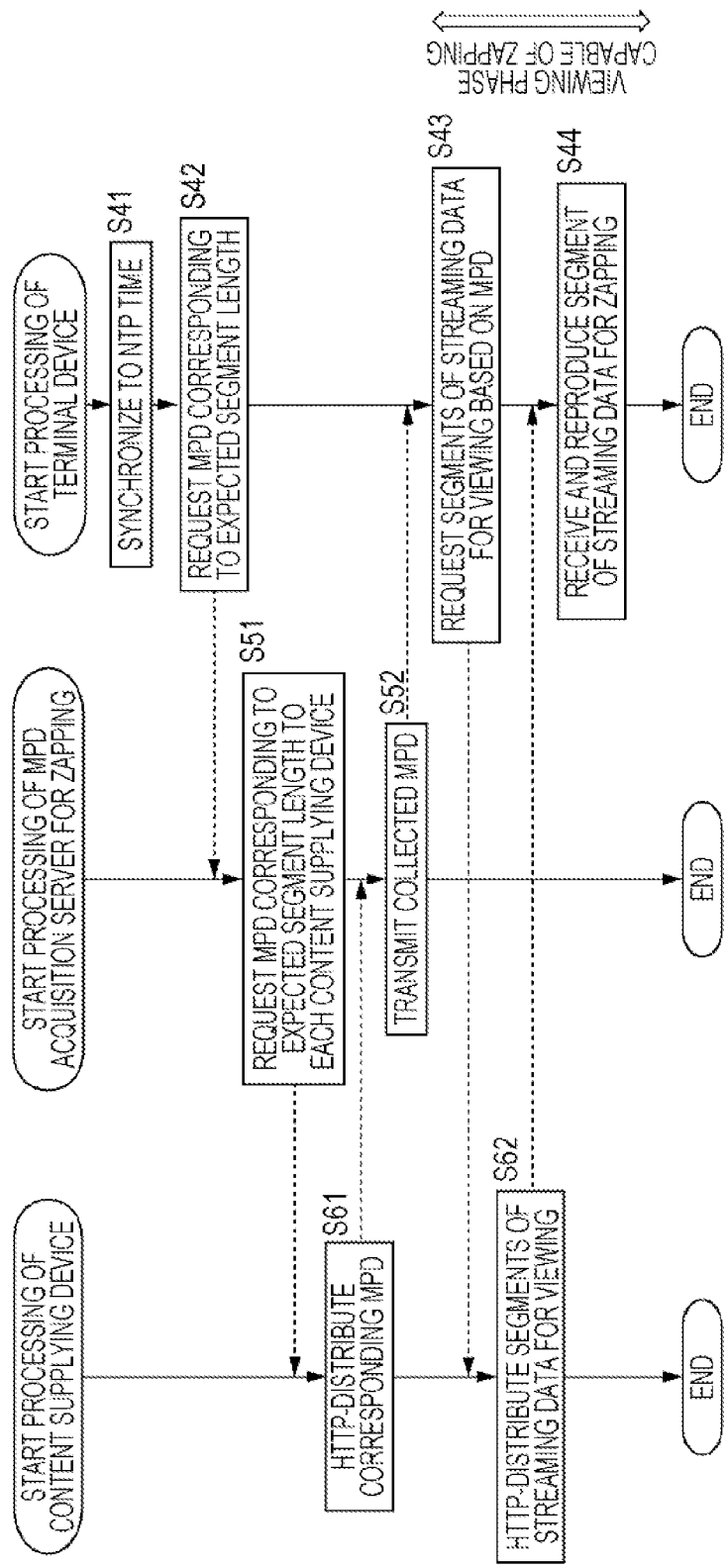
FIG. 11 is a flowchart that describes a modification example of the series of processes of the content supply system.

Next, FIG. 11 is a flowchart that describes a modification example of the series of processes.

The modification example of the drawing corresponds to a case in which the segment streamer for zapping 63 and the MPD server for zapping 64 are not provided in the content supply device 60, and therefore, the MPDs for zapping and the streaming data for zapping are not prepared. In this case, on the basis of the MPDs for viewing, among the streaming data for viewing, streaming data that is shorter than a length of time that the segment length specifies (streaming data of the expected segment length) is used for zapping.

Step S41, the terminal device 80 is caused to synchronize the system time point thereof with the NTP temporal axis according to system time point information that is provided from the NTP server 12. In Step S42, the terminal device 80 requests MPDs for viewing in order to receive streaming data for viewing that can be used in zapping from the MPD acquisition portal for zapping 70. That is, the terminal device 80 transmits a query API in order to ask for a crawl of the MPDs for viewing that correspond to the expected segment length.

In Step S51, depending on this query API, the MPD acquisition portal for zapping 70 connects to the MPD server for viewing 66 of each content supply device 60, and requests MPDs for viewing that correspond to the expected segment length (MPDs in which at least one of the segmentBase/@duration attribute and the MPD/@maxSegmentDuration attribute is less than or equal to the expected segment length). Depending on this request, in Step S61, the MPD server for viewing 66 of each content supply device 60 performs HTTP distribution of the MPDs for viewing that correspond to the expected segment length to the MPD acquisition portal for zapping 70. In Step S52, the MPD acquisition portal for zapping 70 transmits the accumulated MPDs for viewing to the terminal device 80 from which there was a request.

A terminal device 80 that receives MPDs for viewing that correspond to the expected segment length enters a viewing phase in which rapid zapping is possible. In Step S43, the terminal device 80 requests segments of streaming data for viewing from the segment streamer for viewing 65 of the content supply device 60 on the basis of the MPDs for viewing. Depending on this request, in Step S62, the segment streamer for viewing 65 performs HTTP distribution of the requested segments. In Step S44, the terminal device 80 receives the segments of streaming data for viewing for which HTTP distribution was performed, and reproduces the segments. This concludes the description of the series of processes.

According to the abovementioned modification example of the series of processes, it is possible to rapidly perform zapping between streaming data for viewing in which the segment length is comparatively short.

Additionally, in the abovementioned description, switching between channels in DASH was set to be performed in segment units, but there are also circumstances in which switching is performed in subsegment units in which segments have been further subdivided. In such as case, in the MPDs for zapping and the MPDs for viewing, the definition of an MPD/@SubSegmentDuration attribute that stores a value that represents a subsegment length is essential, and instances of "segment" in the abovementioned description may be read as "subsegment".

Incidentally, in addition to respectively being configured by hardware, it is possible to realize the content supply device 60 and the terminal device 80 that execute the abovementioned series of processes due to a computer executing software. By using a computer in which dedicated hardware is assembled, or installing various programs on the computer, for example, general purpose personal computers that are capable of executing various functions can be included.

Figure 12:
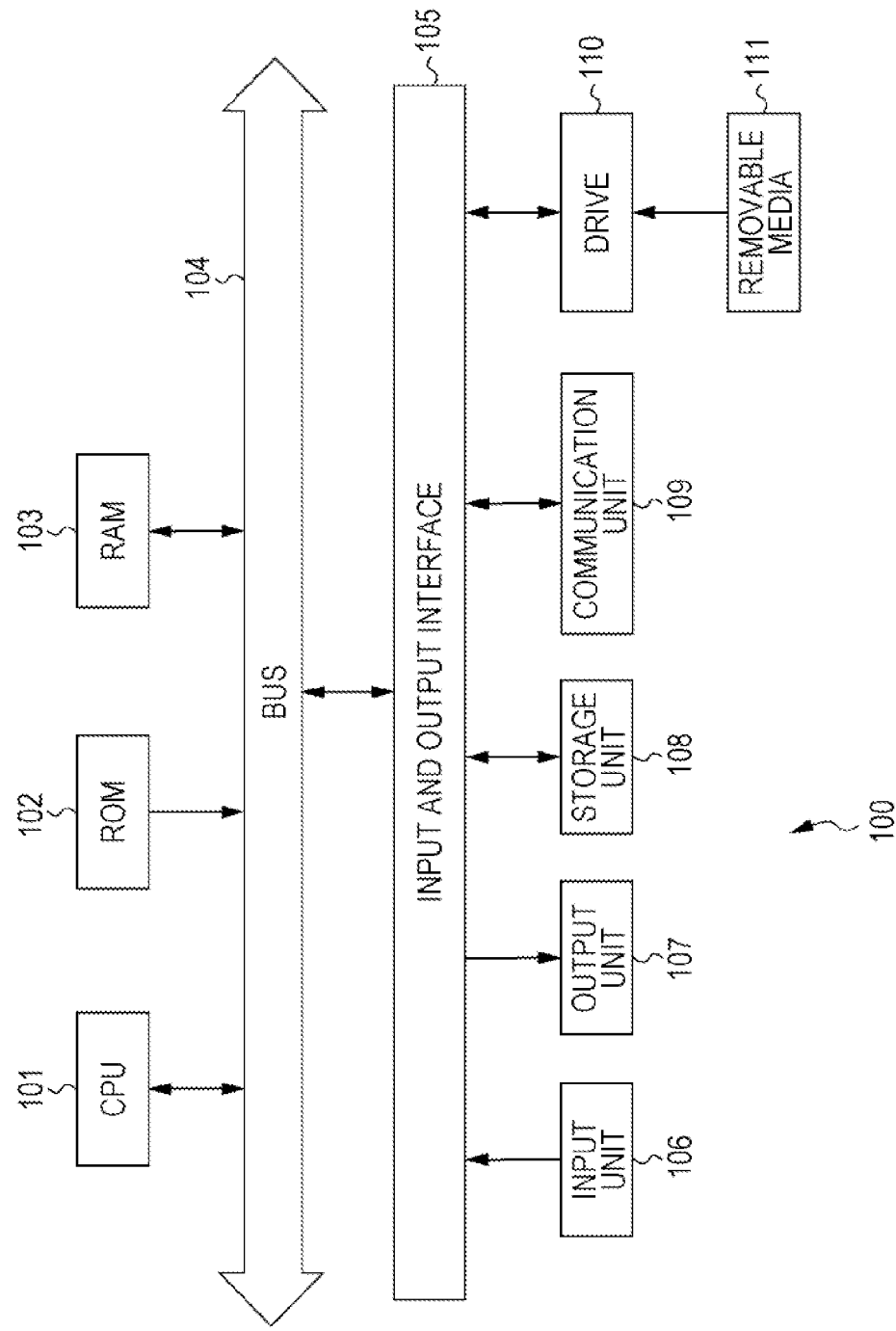
FIG. 12 is a block diagram that shows a configuration example of a computer.

FIG. 12 is a block diagram that shows a configuration example of hardware of the abovementioned computer.

In a computer 100, a Central Processing Unit (CPU) 101, Read Only Memory (ROM) 102, and Random Access Memory (RAM) 103 are mutually connected by a bus 104.

An input/output interface 105 is further connected to the bus 104. An input unit 106, an output unit 107, a storage unit 108, a communication unit 109 and a drive 110 are connected to the input/output interface 105.

The input unit 106 is formed from a keyboard, a mouse, a microphone or the like. The output unit 107 is formed from a display, a speaker or the like. The storage unit 108 is formed from a hard disk, non-volatile memory or the like. The communication unit 109 is formed from a network interface or the like. The drive 110 drives removable media 111 such as a magnetic disc, an optical disc, a magneto-optical disc, or semiconductor memory or the like.

In the computer 100 that is configured in the abovementioned manner, the CPU 101 performs the abovementioned series of processes by loading and executing programs that are stored in the storage unit 108 in the RAM 103 using the input/output interface 105 and the bus 104.

The programs that the computer 100 (the CPU 101) executes can for example, be provided and stored on the removable media 111 as package media or the like. In addition, the programs can be provided using a wired or wireless transmission medium such as a local area network, the Internet, or a digital satellite broadcast.

In the computer 100, by mounting the removable media 111 in the drive 110, it is possible to install the programs on the storage unit 108 using the input/output interface 105. In addition, it is possible to install the programs on the storage unit 108 by receiving the programs with the communication unit 109 via a wired or wireless transmission medium. In addition to these methods, it is possible to install the programs on the ROM 102 or the storage unit 108 in advance.

Additionally, the programs that the computer 100 executes may be programs in which the processes are performed in chronological order in the sequence described in the present specification, or may be programs in which the processes are performed either in parallel, or at a necessary timing such as when an alert is performed.

The embodiments of the present disclosure are not limited to the abovementioned embodiments, and various alterations are possible within a range that does not depart from the scope of the present disclosure.

It is possible for the present disclosure to have the following configurations.

(1)

A content supply device that supplies a plurality of items of streaming data with differing attributes, which is content with identical detail, to the same channel according to an adaptive streaming technique including a supply portion that divides the streaming data into minimum units when the reception of streaming data is switched according to a timing that is made uniform with other channels, and supplies the streaming data in the minimum units to a reception side through a network, and a metafile generation portion that generates metafiles for the reception side to receive the streaming data that is supplied in the minimum units, which show that the streaming data is for zapping.

(2)

The content supply device according to (1), in which the supply portion divides the streaming data into the minimum units according to a timing that is made uniform with other channels that belong to the same group.

(3)

The content supply device according to (1) or (2), in which the supply portion synchronizes with an NTP temporal axis, matches leading ends of the minimum units with other channels that belong to the same group, and divides the streaming data into the minimum units using a length of time that is made uniform with other channels that belong to the same group.

(4)

The content supply device according to any one of (1) to (3), in which the supply portion divides the streaming data for zapping into the minimum units using a length of time that is shorter than the minimum units of the streaming data for viewing.

(5)

The content supply device according to any one of (1) to (4), in which the metafile generation portion generates expanded MPDs as the metafiles.

(6)

The content supply device according to any one of (1) to (5), in which the content supply further includes an accumulator portion that accumulates the metadata for zapping, and supplies the metadata for zapping to the reception side.

(7)

The content supply device according to (6), in which the metafile generation portion generates the MPDs into which MPD/@NTPSynchronized attributes and MPD/SegmentAlignedGroupID attributes have been introduced as the metafiles, and the accumulator portion accumulates the metadata for zapping on the basis of the MPD/@NTPSynchronized attributes and the MPD/SegmentAlignedGroupID attributes.

(8)

The content supply device according to (6), in which the metafile generation portion generates the MPDs into which MPD/@forZapping attributes have been introduced as the metafiles, and the accumulator portion accumulates the metadata for zapping on the basis of the MPD/@forZapping attributes.

(9)

The content supply device according to (6), in which the metafile generation portion defines at least one of a length of time of the minimum units or a maximum length of time of the streaming data in the metadata as the metafiles, and the accumulator portion accumulates the metadata for zapping on the basis of at least one of the length of time of the minimum units or the maximum length of time of the streaming data.

REFERENCE SIGNS LIST

11 Internet
12 NTP server
50 content supply system
60 content supply device
61 channel server
62 DASH server
63 segment streamer for zapping
64 MPD server for zapping
65 segment streamer for viewing
66 MPD server for viewing
70 MPD acquisition server for zapping
80 terminal device
100 computer
101 CPU

The invention claimed is:

1. A content supply device that supplies a plurality of items of streaming data with differing attributes, which is content with identical detail, to a same channel according to an adaptive streaming technique, comprising:
    a supply portion that divides the streaming data into minimum units when the reception of streaming data is switched according to a timing that is made uniform with other channels, and supplies the streaming data in the minimum units for reception by a reception side through a network; and
    a metafile generation portion that generates metafiles for reception by the reception side to receive the streaming data that is supplied in the minimum units, which show that the streaming data is for zapping.

2. The content supply device according to claim 1, wherein the supply portion divides the streaming data into the minimum units according to a timing that is made uniform with other channels that belong to the same group.

3. The content supply device according to claim 2, wherein the supply portion synchronizes with an NTP temporal axis, matches leading ends of the minimum units with other channels that belong to the same group, and divides the streaming data into the minimum units using a length of time that is made uniform with other channels that belong to the same group.

4. The content supply device according to claim 2, wherein the supply portion divides the streaming data for zapping into the minimum units using a length of time that is shorter than the minimum units of the streaming data for viewing.

5. The content supply device according to claim 2, wherein the metafile generation portion generates expanded MPDs as the metafiles.

6. The content supply device according to claim 2, further comprising:
    an accumulator portion that accumulates the metadata for zapping, and supplies the metadata for zapping to the reception side.

7. The content supply device according to claim 6, wherein the metafile generation portion generates the MPDs into which MPD/@NTPSynchronized attributes and MPD/SegmentAlignedGroupID attributes have been introduced as the metafiles, and
    the accumulator portion accumulates the metadata for zapping on the basis of the MPD/@NTPSynchronized attributes and the MPD/SegmentAlignedGroupID attributes.

8. The content supply device according to claim 6, wherein the metafile generation portion generates the MPDs into which MPD/@forZapping attributes have been introduced as the metafiles, and
    the accumulator portion accumulates the metadata for zapping on the basis of the MPD/@forZapping attributes.

9. The content supply device according to claim 6, wherein the metafile generation portion defines at least one of a length of time of the minimum units or a maximum length of time of the streaming data in the metadata as the metafiles, and
    the accumulator portion accumulates the metadata for zapping on the basis of at least one of the length of time of the minimum units or the maximum length of time of the streaming data.

10. A content supply method of a content supply device that supplies a plurality of items of streaming data with differing attributes, which is content with identical detail, to a same channel according to an adaptive streaming technique, the method comprising:
    a supply step of dividing the streaming data into minimum units when the reception of streaming data is switched according to a timing that is made uniform with other channels, and supplying the streaming data in the minimum units for reception by a reception side through a network; and
    a metafile generation step of generating metafiles for reception by the reception side to receive the streaming data that is supplied in the minimum units, which show that the streaming data is for zapping,
    the supply step of dividing and the metafile generation step are executed by the content supply device.

11. A non-transitory computer readable memory having stored thereon a program that when executed causes a computer that supplies a plurality of items of streaming data with differing attributes, which is content with identical detail, to a same channel according to an adaptive streaming technique, to function as:
    a supply portion that divides the streaming data into minimum units when the reception of streaming data is switched according to a timing that is made uniform with other channels, and supplies the streaming data in the minimum units for reception by a reception side through a network; and
    a metafile generation portion that generates metafiles for reception by the reception side to receive the streaming data that is supplied in the minimum units, which show that the streaming data is for zapping.

12. A terminal device that receives streaming data that is supplied from a content supply device that supplies a plurality of items of the streaming data with differing attributes, which is content with identical detail, to a same channel according to an adaptive streaming technique,
  wherein the content supply device includes:
    a supply portion that divides the streaming data into minimum units when the reception of streaming data is switched according to a timing that is made uniform with other channels, and supplies the streaming data in the minimum units to a reception side through a network; and
    a metafile generation portion that generates metafiles for the terminal device to receive the streaming data that is supplied in the minimum units, which show that the streaming data is for zapping, and
  acquires the metafiles for zapping, and switches the reception of the streaming data that is respectively supplied from different channels on the basis of the acquired metafiles for zapping.

13. A content supply system that is formed from a content supply device that supplies a plurality of items of the streaming data with differing attributes, which is content with identical detail, to a same channel according to an adaptive streaming technique, and a terminal device that receives the streaming data
  wherein the content supply device includes:
    a supply portion that divides the streaming data into minimum units when the reception of streaming data is switched according to a timing that is made uniform with other channels, and supplies the streaming data in the minimum units to a reception side through a network; and
    a metafile generation portion that generates metafiles for the terminal device to receive the streaming data that is supplied in the minimum units, which show that the streaming data is for zapping, and
  wherein the terminal device acquires the metafiles for zapping, and switches the reception of the streaming data that is respectively supplied from different channels on the basis of the acquired metafiles for zapping.

* * * * *